(12) United States Patent
Lee et al.

(10) Patent No.: US 10,152,416 B2
(45) Date of Patent: Dec. 11, 2018

(54) BUFFER CACHE APPARATUS, JOURNALING FILE SYSTEM AND JOURNALING METHOD FOR INCORPORATING JOURNALING FEATURES WITHIN NON-VOLATILE BUFFER CACHE

(71) Applicant: EWHA UNIVERSITY-INDUSTRY COLLABORATION FOUNDATION, Seoul (KR)

(72) Inventors: Eunji Lee, Seoul (KR); Hyokyung Bahn, Seoul (KR); Sam H. Noh, Seoul (KR)

(73) Assignee: EWHA UNIVERSITY-INDUSTRY COLLABORATION FOUNDATION, Seoul (KR)

( * ) Notice: Subject to any disclaimer, the term of this patent is extended or adjusted under 35 U.S.C. 154(b) by 250 days.

(21) Appl. No.: 13/862,597

(22) Filed: Apr. 15, 2013

(65) Prior Publication Data

US 2014/0297918 A1    Oct. 2, 2014

(30) Foreign Application Priority Data

Mar. 29, 2013 (KR) .................. 10-2013-0034598

(51) Int. Cl.
*G06F 12/0804* (2016.01)
*G06F 12/0871* (2016.01)
*G06F 11/14* (2006.01)

(52) U.S. Cl.
CPC ........ *G06F 12/0804* (2013.01); *G06F 11/141* (2013.01); *G06F 11/1474* (2013.01); *G06F 12/0871* (2013.01)

(58) Field of Classification Search
CPC .................................................. G06F 12/0804
(Continued)

(56) References Cited

U.S. PATENT DOCUMENTS 4,654,819 A * 3/1987 Stiffler et al. ............... 711/162
8,549,222 B1 * 10/2013 Kleiman ............... G06F 3/0613
711/103

(Continued)

FOREIGN PATENT DOCUMENTS

JP    2004-252686    9/2004
JP    2012-014735    1/2012
(Continued)

OTHER PUBLICATIONS

Eunji Lee, Studies on Memory and Storage Management for Non-volatile Memory Systems, thesis for a doctorate, Seoul National University (Apr. 18, 2012).
(Continued)

*Primary Examiner* — Gautam Sain
(74) *Attorney, Agent, or Firm* — Lex IP Meister, PLLC

(57) ABSTRACT

Disclosed herein are a buffer cache apparatus, a journaling file system, and a journaling method capable of incorporating journaling features based on nonvolatile memory. The buffer cache apparatus provides a data buffering function between a central processing unit (CPU) and storage. The buffer cache apparatus includes a plurality of cache blocks and a journal management unit. The plurality of cache blocks are configured as volatile or nonvolatile memory devices. The journal management unit maintains states of freezing for write-protecting dirty up-to-date cache blocks among the plurality of cache blocks.

10 Claims, 8 Drawing Sheets

(58) Field of Classification Search
USPC .......................................................... 711/144
See application file for complete search history.

(56) References Cited

U.S. PATENT DOCUMENTS

| | | | |
|---|---|---|---|
| 2004/0193945 A1* | 9/2004 | Eguchi et al. ..................... | 714/6 |
| 2006/0004860 A1* | 1/2006 | Liedes ................ | G06F 11/1471 |
| 2007/0233981 A1* | 10/2007 | Arakawa et al. ............. | 711/162 |
| 2008/0104334 A1* | 5/2008 | Bellaton et al. ............. | 711/141 |
| 2011/0119451 A1* | 5/2011 | Fuller et al. .................. | 711/144 |
| 2012/0144109 A1* | 6/2012 | Balakrishnan et al. ...... | 711/113 |
| 2013/0086330 A1* | 4/2013 | Baddepudi .......... | G06F 12/0868 |
| | | | 711/143 |
| 2013/0332660 A1* | 12/2013 | Talagala et al. ............. | 711/103 |
| 2014/0281131 A1* | 9/2014 | Joshi ................... | G06F 12/0804 |
| | | | 711/103 |

FOREIGN PATENT DOCUMENTS

| | | |
|---|---|---|
| KP | 1020140083338 | 7/2014 |
| WO | 02/073416 | 9/2002 |

OTHER PUBLICATIONS

Eunji Lee et al, Unioning of the Buffer Cache and Journaling Layers with Non-volatile Memory, Proceedings of FAST '13, pp. 73-80, 11th USENIX Conference on File and Storage Technologies, San Jose, CA, USA (Feb. 12, 2013).

* cited by examiner

BUFFER CACHE APPARATUS, JOURNALING FILE SYSTEM AND JOURNALING METHOD FOR INCORPORATING JOURNALING FEATURES WITHIN NON-VOLATILE BUFFER CACHE

GOVERNMENT SPONSORSHIP STATEMENT

This work was supported by the National Research Foundation of Korea (NRF) grant funded by the Korea government (MEST) (No. 2011-0028825) and by the IT R&D program MKE/KEIT of Korea (No. 10041608, Embedded System Software for Newmemory based Smart Devices).

BACKGROUND OF THE INVENTION

1. Field of the Invention

The present invention relates to a file system and, more particularly, to a file system having a journaling function.

2. Description of the Related Art

A conventional method for dealing with the system failure of a file system is to check the integrity of a file system using a predetermined utility ware, such as "fsck" in Linux, upon booting. When a problem is found by checking the file system, the system fixes the problem automatically, or reboots as recovery mode so that a user can manually recover the file system if the problem cannot be automatically fixed.

For some operating systems, the utility wares, such as "fsck," are always executed at a mount time in order to check the persistency of metadata of a file system. Accordingly, in the conventional method, the operating system needs to always check the file system because one cannot know when a problem will occur, and further should sequentially check the large file system because one cannot know where a problem will be found.

Meanwhile, file system metadata is auxiliary configuration management data for managing data systemically existing on a disk, and is generated in response to creating or deleting files, creating or deleting directories, and increasing or decreasing file size. In other words, file system metadata is information about changes that are reflected to a file system.

A journaling technique is a technique that puts down changes on a journal before writing the changes on a file system and then manages metadata about the changes as logs. A journaling technique enables a file system to be recovered with high reliability upon the system failure.

A file system using a journaling technique is referred to as a journaling file system. In general, a journaling file system records changes, or changes with metadata, in a specially prepared journal area, and then records the most up-to-date changes at the original locations of storage at predetermined points of time. This is referred to as a checkpoint operation.

For recording changes in the journal area, a commit operation is performed. The commit operation manages a series of updates that should be coherently updated on a transaction basis, and ensures that all data related to the transactions are successfully recorded in the journal area, generally at cycles with a few seconds.

Journaling file systems have been developed with somewhat differently detailed policies depending on the developer. For example, depending on the policies, the journaling file systems may record changes at the original locations of storage before recording metadata in a journal area, or may record metadata and changes in a journal and then record the changes again at the original locations of storage. Furthermore, depending on the policies, the journaling file systems may checkpoint the journal at times of insufficient remaining space in the journal or at predetermined points of time.

The journal area of the journaling file system uses a part of nonvolatile storage because a stored status should be maintained at and even after a system failure.

A problem arises in that a journaling task frequently generates a commit operation every few seconds even in order to reduce the weakness of a system, thereby producing considerable storage traffic, while, without journaling, updated data are moved from main memory to storage and then are stored in the storage only when cache should be cleared because of insufficient marginal space in caches. This incurs significant reduction in the performance of hard disks and cloud storages with their high access cost. In particular, performance and durability may be significantly reduced in a flash memory based environment that allows write operations to be performed at low speed with a limited number of operations.

Although there is a consensus that cloud storage systems, recently attracting attention, require a journaling file system, the journaling file system has not been easily adapted to cloud storage systems because of the network access cost due to journaling.

In order to overcome the above problems, a dedicated memory to journaling formed of nonvolatile memory has been proposed. However, this results in the addition of a separate memory that should be managed by an Operating System (OS) in addition to main memory, buffer caches and mass storage, and thus significant changes in memory architecture may be required in terms of software and hardware. Furthermore, two write operations from the buffer cache to each of the nonvolatile journaling memory and the storage are still required. Accordingly, even though reliability is improved, there may be no significant advantages in terms of cost, speed and performance.

Meanwhile, although constructing nonvolatile buffer caches using nonvolatile memory, such as phase-change memory (PCM) or spin transfer torque magnetic random access memory (STT-MRAM), which enables random access during read and write operations, as main memory, seems to easily overcome the above problem, the above problems cannot be easily overcome in practice.

The reliability of a journaling file system requires not only that data be maintained upon a system failure occurring, but also that the consistency of data be guaranteed during resupply of power after power cut or rebooting after the system failure.

For example, the data of a buffer cache and corresponding metadata should be changed at the same time. That is, if a system fails immediately after data has been updated in a nonvolatile buffer cache, not-yet-updated metadata becomes inconsistent to updated data even though the updated data remains intact in the nonvolatile buffer cache after rebooting. If the updated data with not-yet-updated metadata is reflected to the original locations of the storage, the consistency of the file system will be broken.

SUMMARY OF THE INVENTION

An object of the present invention is to provide a buffer cache apparatus, a journaling file system, and a journaling method capable of incorporating journaling features based on nonvolatile memory.

In accordance with an aspect of the present invention, there is provided a buffer cache apparatus for providing a data buffering function between a central processing unit (CPU) and storage, including a plurality of cache blocks configured as volatile or nonvolatile memory devices; and a journal management unit configured to maintain settings of freezing dirty up-to-date cache blocks that belong to the plurality of cache blocks.

The content of data blocks that are being cached by the frozen dirty up-to-date cache blocks may be checkpointed to the storage.

The journal management unit may freeze normal dirty up-to-date cache blocks upon an in-place commit being performed, thereby maintaining settings of freezing the corresponding cache blocks.

When the content of a data block that is being cached by the frozen up-to-date dirty cache blocks is changed, the corresponding cache block may enter a frozen dirty out-of-date state, and the cache block that enters a frozen dirty out-of-date state before being checkpointed to the storage may be released from being frozen and returned as a free cache block.

After a system failure, frozen up-to-date dirty cache blocks of the cache blocks may be updated in the storage by referring to the journal management unit.

In accordance with another aspect of the present invention, there is provided a journaling file system, including storage; a buffer cache apparatus configured to include a plurality of cache blocks that are implemented as volatile or nonvolatile memory devices, to provide a disk buffering function between a CPU and the storage, and to include a journal management unit that maintains settings of freezing dirty up-to-date cache blocks that belong to the plurality of cache blocks; and a control unit configured to trigger read/write operations, freezing settings and checkpoint operations on the cache blocks.

In accordance with still another aspect of the present invention, there is provided a journaling method using a buffer cache apparatus for providing a disk buffering function between a CPU and storage, including step (a) of, upon an update write operation being performed on a data block for which the writing of changed content has been requested, update-writing, by the buffer cache apparatus, the changed content on the corresponding cache block, or searching, by the buffer cache apparatus, for a free cache block and writing, by the buffer cache apparatus, the changed content on the found free cache block, depending on the freezing setting of the cache block that is caching the corresponding data block, and maintaining, by the buffer cache apparatus, a list of up-to-date dirty cache blocks; step (b) of, when an in-place commit operation is triggered, freezing, by the buffer cache apparatus, cache blocks referenced by the list of up-to-date dirty cache blocks, and maintaining, by the buffer cache apparatus, a list of frozen up-to-date dirty cache blocks; and step (c) of, when a checkpoint operation is triggered, updating, by the buffer cache apparatus, original data of the storage by checkpointing cache blocks referenced by the list of frozen up-to-date dirty cache blocks, and setting, by the buffer cache apparatus, the checkpointed cache blocks to a clean state.

The list of up-to-date dirty cache blocks having the changed content may be maintained as a list of running transactions, that is, transactions related to cache blocks that enter an up-to-date dirty state because the changed content of data blocks is written on free or state cache blocks.

Step (a) may include the step of searching, by the buffer cache apparatus, for a cache block that is caching previous content of a data block for which the writing of the changed content has been requested; the step of, if the found cache block is determined to be frozen, searching, by the buffer cache apparatus, for a new free cache block other than a frozen cache block, and writing, by the buffer cache apparatus, the changed content on the found free cache block; the step of changing, by the buffer cache apparatus, the frozen cache block that is caching the previous content from an up-to-date dirty state to an out-of-date dirty state, and changing, by the buffer cache apparatus, the cache block on which the changed content has been written from a free state to an up-to-date dirty state; the step of, if the found cache block is determined not to be frozen, writing, by the buffer cache apparatus, the changed content on the cache block that has not been frozen; and the step of, with regard to the cache blocks that have entered an up-to-date dirty state, maintaining, by the buffer cache apparatus, a list of running transactions related to the cache blocks on which the changed content has been written.

The list of frozen up-to-date dirty cache blocks may be maintained as a list of checkpoint transactions, that is, transactions related to up-to-date dirty cache blocks frozen during in-place commit operations, based on a list of running transactions that is processed for cache blocks that are written upon update write operations being performed.

Step (b) may include the step of converting, by the buffer cache apparatus, listed running transactions into commit transactions; the step of, if there is a cache block connected to the resulting commit transactions, freezing, by the buffer cache apparatus, a cache block corresponding to the commit transaction; the step of, if there is a cache block having a previous version of content among the frozen cache blocks, including, by the buffer cache apparatus, the cache block having the previous version of content in an obsolete block list; the step of converting, by the buffer cache apparatus, the commit transactions into checkpoint transactions; and the step of eliminating, by the buffer cache apparatus, cache blocks included in the obsolete block list from respective transaction lists.

Step (c) may include the step of, if one or more checkpoint transactions remain in the list of checkpoint transactions, sequentially transmitting, by the buffer cache apparatus, cache blocks corresponding to the respectively checkpoint transactions to the storage; and the step of initializing, by the buffer cache apparatus, the list of checkpoint transactions.

The journaling method may further include the step of, upon a read operation being performed, reading, by the buffer cache apparatus, a cache block having most up-to-date content from among cache blocks that cache content of data blocks, the reading of which has been requested, and outputting, by the buffer cache apparatus, the content; and the step of, upon a new write operation being performed on a new data block that has not been cached previously, writing, by the buffer cache apparatus, the content of the new data block, the writing of which has been requested, on a cache block in a free state.

The journaling method may further include step (d) of, when a system recovery operation is triggered, updating, by the buffer cache apparatus, the storage based on cache blocks that belong to cache blocks and that are referenced by a list of frozen dirty cache blocks.

The list of frozen dirty cache blocks may be maintained as a list of checkpoint transactions that, when running transactions processed for cache blocks written upon update write operations being performed are converted into commit transactions upon in-place commit operations being performed, are processed for up-to-date dirty cache blocks of cache blocks frozen during in-place commit operations in response to the commit transactions; and the list of running transactions, the list of commit transactions or the list of checkpoint transactions may be recorded in the journal management unit.

Step (d) may include the step of, when a system recovery operation is triggered, updating, by the buffer cache apparatus, the storage with frozen dirty cache blocks based on pending checklist transactions in the journal management unit; the step of invalidating and initializing, by the buffer cache apparatus, a commit transaction, the in-place commit of which has not been completed; and the step of invalidating and initializing, by the buffer cache apparatus, a running transaction remaining in the journal management unit.

DESCRIPTION OF THE PREFERRED EMBODIMENTS

Figure 1:
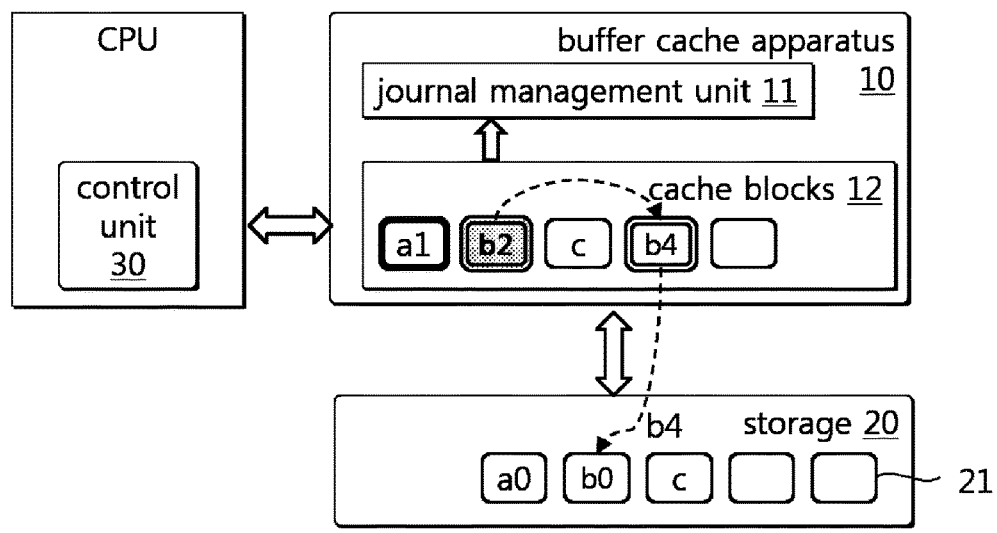
FIG. 1 is a block diagram illustrating a journaling file system having buffer caches with journaling features based on nonvolatile memory according to an embodiment of the present invention.

Although embodiments of the present invention will be described in conjunction with specific structures and functions, the specific structures and functions are provided merely to illustrate the embodiments of the present invention. The embodiments of the present invention may be embodied in various forms, and it should not be appreciated that the present invention is limited to the described embodiments.

The embodiments of the present invention will be described in detail below with reference to the accompanying drawings. The same elements in the drawings will be assigned the same reference numerals, and redundant descriptions of the same elements will be omitted.

The present invention was devised based on the results of research that was conducted under the sponsorship of a senior research supporting project entitled "Design of Embedded OS for Smart Devices based on Analysis of Program Characteristics" (Korean Government Project Serial No. 1345160771) that was managed by the National Research Foundation of Korea under the Korean Ministry of Education, Science and Technology.

FIG. 1 is a block diagram illustrating a journaling file system having buffer caches with journaling features based on nonvolatile memory according to an embodiment of the present invention.

Referring to FIG. 1, a buffer cache apparatus 10 may be implemented as any of nonvolatile devices capable of high-speed random access, for example, phase-change memory (PCM), spin transfer torque magnetic random access memory (STT-MRAM) or the like, and may provide data buffering functionality to a mass storage 20. The storage 20 may be implemented as a common hard disk, a solid-state drive (SSD), or the like.

Although the buffer cache apparatus 10 is described chiefly based on nonvolatile devices in the specification of this application, the present invention may be adapted with volatile memory as long as power is normally supplied thereto.

Furthermore, although the buffer cache apparatus 10 is described as an apparatus separate from main memory, this is merely for sake of illustration, and the buffer cache apparatus 10 is not limited to such description and may instead be implemented within a part of memory area of the main memory.

The control unit 30 may trigger a read/write operation on a specific cache block and an in-place commit operation and a checkpoint operation on whole cache blocks, with respect to the buffer cache apparatus 10. In response to the in-place commit operation and the checkpoint operation triggered by the control unit 30, the buffer cache apparatus 10 may perform the in-place commit operation and the checkpoint operation on cache blocks corresponding to predetermined conditions.

The control unit 30 may trigger an in-place commit operation or a checkpoint operation, for example, with specific time intervals or whenever the number of frozen blocks reaches a pre-defined threshold value.

Generally, data buffering or disk buffering is the functionality of caching a data block accessed by a CPU, and then may significantly reduce input/output time during a reading/writing operation to a data block. Instead, changes should be periodically or on demand reflected to a disk by flushing cached data blocks to the disk.

While the term "disk" normally refers to a device for recording data on a surface of a round media, such as a hard disk in a narrow sense, it is used in the specification and claims of this application as a term that collectively refers to all known types of mass storage devices.

The buffer cache apparatus 10 and the storage 20 of the present invention may be compared with a conventional buffer cache apparatus and a storage, as follows.

The conventional file system having disk buffering and journaling functionalities stores, or commits, certain updated data blocks among data blocks buffered in a buffer cache into a journal area separately provided in the storage, according to journaling policies for each corresponding OS. As a result, although reliability is acquired, the original purpose of the disk buffering that is to reduce the number of accesses to a disk, or a storage, whose access time is generally long, may not be achieved. Furthermore, a journaled data block should be finally recorded in a corresponding block within the disk, and thus recordings are required twice, thereby causing the deterioration of performance.

In contrast, the buffer cache apparatus 10 of the present invention in-place commits, for committing cache blocks 12, which write-buffer data blocks 21.

Here, the in-place commit operation proposed by the inventor of the present invention is an operation that sets as "frozen", which means being protected from being overwritten in the context of the present invention, the cache blocks in which the data block 21 have been buffered within the nonvolatile buffer cache apparatus 10 in situ, instead of copying them to a separate journaling area as in the conventional journaling file system, thereby resulting identical consequence to journaling the data blocks 21 to the journal area.

Since a read operation in the cache blocks frozen for in-place commit is performed in the same manner as in common disk buffering cache blocks, the cache blocks have no deterioration of performance as read caches.

However, when the data block 21 is to be updated because of an additional change occurred in the data block 21 that has been being cached by the cache block frozen for in-place commit, the cache block 12 should also be updated, but the content of the updated data block 21 is stored in another free cache block because the former cache block is frozen and thus cannot be overwritten.

Meanwhile, the in-place committed cache block will be checkpointed in the storage 20, that is, stored at an original location in the storage 20, or will be deleted at an appropriate time later pursuant to journaling policies. More specifically, the time when the in-place committed cache block is checkpointed corresponds to the time when the cache block caches the most up-to-date data block content. After being checkpointed, the corresponding cache block is released from being frozen and is converted into a normal cache block on which data can be freely overwritten. In contrast, when the frozen cache block has the out-of-date data block content at the time of checkpoint, the content of the frozen cache block may be deleted, and the frozen cache block may be returned as a free cache block.

Meanwhile, a cache block that is not frozen in the buffer cache apparatus 10 may be read and written without any restrictions in the same manner as a general cache block.

Accordingly, the buffer cache apparatus 10 can achieve the same effect as storing up-to-date data block content in a journal by freezing a cache block storing data block content, and, at the same time, can access all cache blocks as read caches regardless of being frozen or not without the deterioration of performance or overhead.

For this purpose, the buffer cache apparatus 10 includes a journal management unit 11 and the cache blocks 12 therein.

In FIG. 1, the cache block of the cache blocks 12 that is surrounded by a thick solid line box is a dirty cache block having up-to-date changed content a1, and can be overwritten because it is not frozen yet. The content a1 is not yet journaled, that is, it is in the state of being not frozen yet.

Cache blocks b2 and b4 surrounded by double solid line boxes are frozen cache blocks, and are in the state of being in-place committed. Content b2 that is being cached by the cache block with the double solid line box is a dated version of data block content. Since the cache block caching content b2 is frozen, a changed version b4 of the content is stored in a new cache block. Because the content b2 is the out-of-date version of the data block content, it is unnecessary to checkpoint the content b2 to the storage 20. The content b4, which is up-to-date content, will be checkpointed to the storage 20, and the content b2 will be discarded.

Two cache blocks that are surrounded by thin solid line boxes are a cache block in clean state and a free cache block in not-yet-used state, respectively. Content c has not been changed, and thus does not need to be journaled, or committed, and checkpointed to the storage 20.

The buffer cache apparatus 10 generates transactions with regard to cache blocks on which a write operation, an in-place commit operation or a storage checkpoint operation should be performed, or performs the respective operations with reference to such transactions. These transactions are classified into running transactions, commit transactions, and checkpoint transactions depending on their operations.

The journal management unit 11 stores lists and metadata of running transactions to be performed in response to read/write operations, commit transactions to be performed in response to in-place commit operations, and checkpoint transactions to be performed in response to checkpoint operations, and stores metadata about changes data blocks.

In the computer engineering field, the term "transaction" refers to a task unit that includes a series of actions that are performed from the start of the processing of data up to the completion of the processing while guaranteeing the integrity of the data.

Running transactions are transactions related to cache blocks that turn to up-to-date dirty cache state from a free or clean cache state, due to request of write operations for the cache blocks with updated contents of the corresponding data blocks. In other words, a list of running transactions that is generated and managed upon a write operation is the same as a list of cache blocks in a normal over-writable up-to-date dirty state.

Commit transactions are transactions related to up-to-date dirty cache blocks that are to be set to a frozen state upon an in-place commit operation.

Checkpoint transactions are transactions related to frozen up-to-date dirty cache blocks that will be released from being the frozen state upon a checkpoint operation.

The cache blocks 12 may function as cache blocks for disk buffering, on which read/write operations can be freely performed, when they are in a normal state, and function as cache blocks for journaling, on which a read operation is freely performed but a write operation is limited, when they are in the state of being set as frozen.

A cache block in which any data block content has not been stored may be referred to as a free cache block, and a cache block in which a fresh data block content has not been changed after being stored may be referred to as a clean cache block. As a clean cache block is in the state of not being changed, it functions as a read or write cache and is not the target of an in-place commit operation.

If content has been changed in a data block that is being cached by a clean cache block, the corresponding cache block is overwritten with the changed content of the data block. After the clean cache block has been overwritten with the changed data block, it is referred to as a dirty cache block and still remains in a normal state free to be overwritten. Since a dirty cache block corresponds to the case in which at least one change has occurred in the content of a data block, it may be the target of an in-place commit operation for journaling. Accordingly, the buffer cache apparatus 10 adds a running transaction for the dirty cache block to the list of the running transactions, and records metadata of the added running transaction in the journal management unit 11.

Unless the dirty cache block will be frozen later, the dirty cache block may be repeatedly overwritten with newly updated data content later and may remain in a normal dirty state.

Meanwhile, if a dirty cache block in which the content of a data block has been stored is a frozen dirty cache block, it may be necessary to search for a new free cache block and then store the changed content of the data block in order to cache the changed content. In this case, the previously cached content of the frozen dirty cache block that was the target of the write operation request is the content before being changed, and the dirty cache block may be referred to as a frozen dirty out-of-date cache block. In contrast, the cache block in which the changed content of the data block has been newly stored already has the changed content, even though the content has been recorded in the corresponding cache block for the first time, and thus it is referred to as a normal dirty up-to-date cache block, not a normal clean up-to-date cache block.

The normal dirty cache block having the changed content from the first as described above may be also subject to an in-place commit operation for journaling. Accordingly, the buffer cache apparatus 10 adds a running transaction for the normal up-to-date dirty cache block to the list of running transactions, and records the metadata of the added running transaction in the journal management unit 11.

Thus, a dirty cache block in a normal overwritable state is subject to an in-place commit operation as long as it can be considered as having undergone change at least once and having up-to-date content at present. In contrast, a clean cache block in a normal state is not subject to an in-place commit operation.

Running transactions are created for normal dirty cache blocks. Accordingly, the buffer cache apparatus 10 maintains a list of running transactions, specifically a list of cache blocks connected to the running transactions, converts the running transactions to commit transactions when in-place commit operations are triggered by the control unit 30 and performs in-place commit operations with respect to the commit transactions on all the cache blocks of the buffer cache apparatus 10 requiring in-place commit operations in a batch manner. The normal up-to-date dirty cache blocks corresponding to the commit transactions obtained through the conversion are set as frozen upon in-place commit operations and become the frozen up-to-date dirty cache blocks in a batch manner. Immediately after conversion to the commit transactions, the list of running transactions are initialized, and dirty cache blocks are tracked again.

Meanwhile, commit transactions may be added to a list of checkpoint transactions that will be checkpointed upon checkpoint operations. If in-place committed cache blocks remain in an up-to-date state after further in-place commit operations and checkpoint operation at last, that is, if the content of data blocks that are cached by the cache blocks do not change thereafter the first in-place commit operation, the checkpoint transactions for the corresponding cache blocks maintain their positions in the list of the checkpoint transactions.

If, during an in-place commit operation, there is a frozen cache block, that caches the same data block as a certain normal cache block to be in-place committed but has the out-of-date content than the normal cache block, a checkpoint transaction for the frozen out-of-date dirty cache block, which was added to the list of the checkpoint transactions at one of the previous in-place commit operations, may be eliminated from the list of the checkpoint transactions. The cache block eliminated from the list may be included in a list of obsolete blocks instead.

When a checkpoint operation is triggered, cache blocks corresponding to checkpoint transactions remaining in the list of the checkpoint transactions are checkpointed, released from being frozen, and are turned to clean state, thereby enabling checkpoint operations to be performed in a batch manner.

In some embodiments, checkpoint transactions for frozen out-of-date cache blocks may be maintained duplicatively in both of the obsolete block list and checkpoint transaction list upon an in-place commit operation. When a checkpoint operation is triggered, the cache blocks, which belong to the cache blocks corresponding to checkpoint transactions and are also included in the obsolete block list, may be released from being frozen and returned to free cache blocks in a batch manner. The cache blocks that are not included in the obsolete block list but in the list of checkpoint transactions may be checkpointed, released from being frozen, and turned to clean state.

As described above, the present invention may provide a journaling function by performing in-place commit operations on the cache blocks of the buffer cache apparatus 10.

Thus, in the case in which the system needs to be rebooted due to a problem, such as a power failure, in the system, if a change has occurred in a data block and the problem occurs during journaling, that is, during an in-place commit operation, or before the completion of an in-place commit operation, the system is recovered to a state that was lastly stored, or checkpointed, in the storage 20 before the content of the data block has changed. For example, in FIG. 1, the content a1 of the cache blocks 12 will be discarded because it has not passed any in-place commit operation, and the system is restored with the content a0 that was recorded in the storage 20.

If a problem occurs after the change to the data block has been journaled, that is, after an in-place commit operation has been completed, the system is recovered with the contents that were stored in up-to-date cache blocks among the in-place committed cache blocks in the buffer cache apparatus after changes of the content of the data blocks. For example, in FIG. 1, the content b2 of the cache blocks 12 will be discarded because it is not up-to-date, and the system is recovered by updating content b0 in the storage 20 with content b4 in the cache block 12.

If a system failure occurs in the system while the cache blocks corresponding to the obsolete block list are being eliminated from the checkpoint transaction list, the data that forms a single transaction may has been partially deleted. Even in the case, an up-to-date version of the deleted data is included in the checkpoint list that was generated thereafter, the up-to-date version included in the checkpoint list will be reflected to the file system, and, accordingly, there is no problem with atomicity.

In order to prevent the overall list from being not accessed in the case that a problem occurs in the system while the data of the obsolete block list is eliminated from the checkpoint list, the data may be eliminated from the checkpoint list, in an atomic manner of performing updating the pointers of the list or in a fashion of separately placing and properly setting an obsoleteness flag in a data block header.

If a problem occurs after the change in the data block has been checkpointed to the storage, that is, after checkpoint transactions have been successfully applied to storage, the system will be recovered to a state that was lastly stored in the storage 20 after the content of a data block had changed.

Accordingly, the consistency of the system can be guaranteed in any case.

Figure 2:
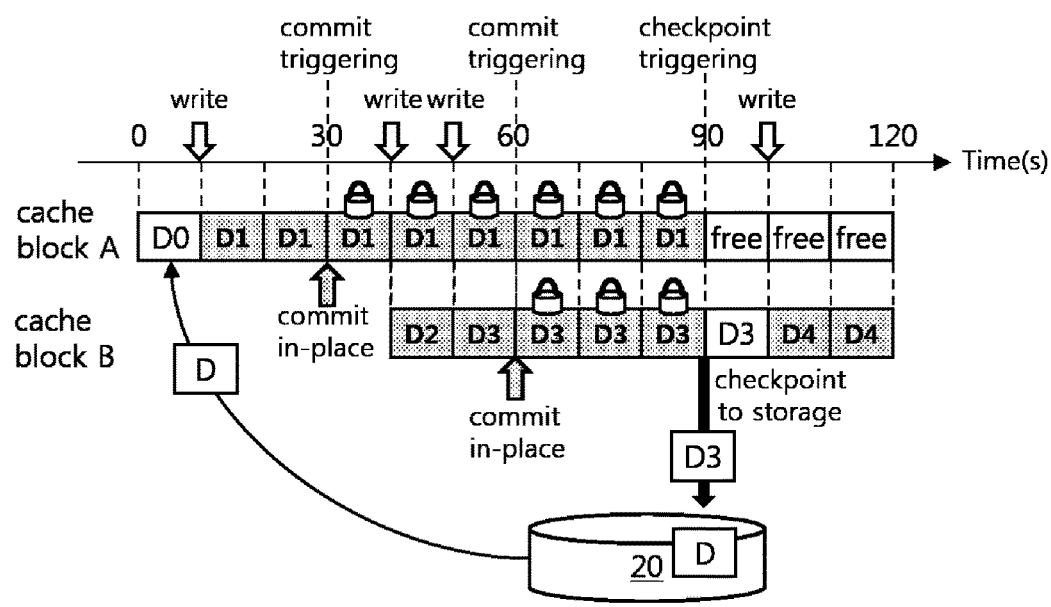
FIG. 2 is a conceptual diagram illustrating the in-place commit operation and checkpoint operation of the committed data from buffer caches to the storage over time in a buffer cache apparatus incorporating journaling features based on nonvolatile memory and storage according to an embodiment of the present invention.

FIG. 2 is a conceptual diagram illustrating the in-place commit operation of the buffer cache and checkpoint operation of the in-place committed data from the buffer cache to the storage over time in a buffer cache apparatus with journaling features based on nonvolatile memory and storage according to an embodiment of the present invention.

Referring to FIG. 2, a process is illustrated as the varying content of data block D is cached by the buffer cache apparatus 10 and finally stored in the storage 20. In the illustration of FIG. 2, an in-place commit is set to be activated every 30 minutes, and a checkpoint operation is set to be activated every 90 minutes.

The process starts with a certain situation where at the first point of time t=0, the data block D having content D0 is read from the storage 20 and the data block D is cached with the content D0 at the cache block A of the buffer cache apparatus 10, or with another situation where the data block content previously stored before t=0 was copied into the storage 20 and cached at the cache block A in the state released from being write-protected. At this time, the cache block A is a clean cache.

At t=10, a write operation changing the content of the data block D from D0 to D1 occurs, and the cache block A is overwritten with the updated content D1. The cache block A is now a dirty cache block.

At t=30, when a first in-place commit operation occurs, the cache block A, which is a dirty cache block, is subject to an in-place commit, and the cache block A is set as frozen, or write-protected. The cache block A is now a frozen up-to-date dirty cache block.

At t=40, a write operation changing the content of the data block D from D1 to D2 occurs, but the cache block A cannot be overwritten because it is a frozen cache block, so thus the up-to-date version D2 of the data block D is stored in a free cache block B. The cache block A is now a frozen out-of-date dirty cache, and the cache block B is a normal up-to-date dirty cache block.

At t=50, when a write operation that changes the content of the data block D from D2 to D3 occurs one more time, the cache block B that stores the content D2 of the data block D is updated with D3.

At t=60, when a second in-place commit operation occurs, the cache block B, which is a dirty cache block, is subject to an in-place commit and is set as frozen. The cache block A is now a frozen out-of-date dirty cache block, and the cache block B is now a frozen up-to-date dirty cache block.

With no write operation for a while, at t=90, when a checkpoint operation occurs, the frozen cache blocks A and B are subject to checkpoint operations. While the cached content of the cache block A is not necessary any longer and is thus returned as a free cache block because the cache block A is an out-of-date dirty cache block, the cached content of the cache block B is transmitted to the storage 20 and released from being frozen because the cache block B is an up-to-date dirty cache block. In particular, since the cached content D3 is an up-to-date content to which the changes in the cache block B have been reflected and is finally stored in a disk, it may be considered as a fresh content for later changes, and accordingly the cache block B is converted to a clean cache block upon a checkpoint operation.

At t=90, all frozen cache blocks are released from being frozen, and contents that should be stored in the storage 20 are all stored in the storage 20. After t=90, it may be understood that the situations between t=0 and t=90 is repeated in the same manner.

Meanwhile, from t=60 at which the updated content D2 of the data block is in-place committed, the cached content D1 of the cache block A may be regarded as obsolete content.

In this case, maintaining the cache block A in a frozen state until the checkpoint operation may be considered as wasting cache space. However, continuously monitoring such a situation and performing the operation of returning a cache block each time needs to suffer overhead in performance.

Accordingly, in an embodiment, as illustrated in FIG. 2, all frozen cache blocks may be maintained up to a checkpoint operation. Upon a checkpoint operation, among all of the frozen cache blocks, out-of-date or obsolete dirty cache blocks may be released from being frozen, the content thereof may be deleted, and the out-of-date or obsolete dirty cache blocks may be returned as free cache blocks. In contrast, up-to-date dirty cache blocks may be stored in the storage 20 and converted into clean cache blocks.

In contrast, in some embodiments, after contents to be used to update frozen dirty cache blocks have been stored in new cache blocks, then the frozen out-of-date or obsolete dirty cache blocks may be released from being frozen, the contents thereof may be deleted, and the frozen out-of-date or obsolete dirty cache blocks may be returned as free cache blocks, at the time when up-to-date versions of data are in-place committed, without waiting till a checkpoint operation.

Figure 3:
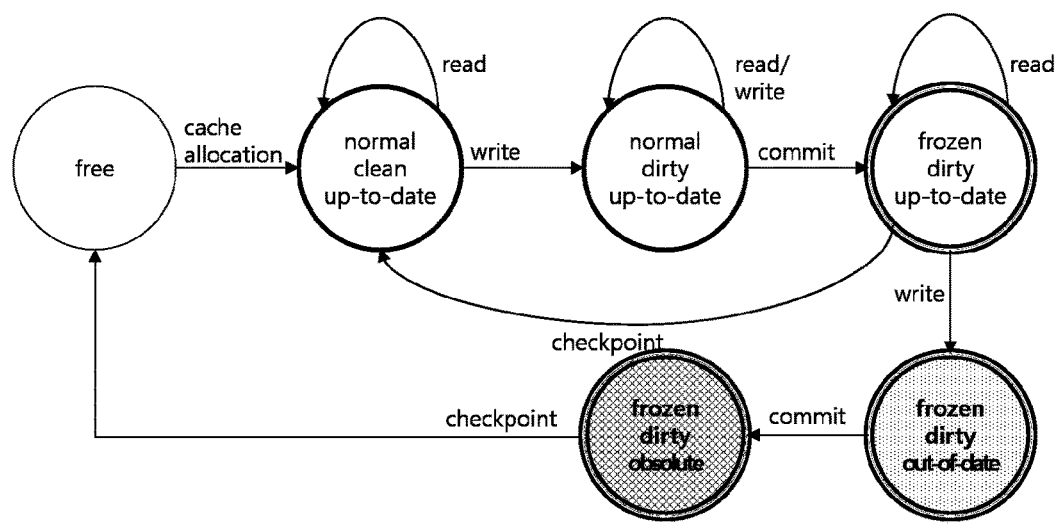
FIG. 3 is a state diagram illustrating changes in the state of any one cache block in the buffer cache apparatus incorporating journaling features based on nonvolatile memory according to an embodiment of the present invention.

FIG. 3 is a state diagram illustrating changes in the state of a certain cache block in the buffer cache apparatus with journaling features based on nonvolatile memory according to an embodiment of the present invention.

Referring to FIG. 3, the cache blocks may change among a free state, a normal up-to-date clean state, a normal up-to-date dirty state, a frozen up-to-date dirty state, and a frozen out-of-date dirty state in response to a read/write operation, an in-place commit operation, and a checkpoint operation.

A cache block is vacant from the first, or becomes a free cache block when the content thereof is deleted and then returned. When a cache write operation occurs at a free state, a corresponding cache block becomes a normal (which means over-writable in the context of the present invention) up-to-date clean cache block if content to be written is a fresh content that has not been changed.

When a write operation is performed on the normal up-to-date clean cache block, the cache block becomes a normal up-to-date dirty state. As long as the cache block remains at a normal state, a write operation can be repeatedly performed.

Furthermore, when a cache write operation occurs at a free state, if the write-requested content is written on the free cache, instead of a frozen cache block, the corresponding cache can be dubbed as a normal up-to-date dirty cache block.

Meanwhile, in-place commit operations are performed on normal up-to-date dirty cache blocks. After in-place commit operations are performed, normal up-to-date dirty cache blocks enter a frozen up-to-date dirty state.

A frozen up-to-date dirty cache block may be subject to a write operation when the content of a data block being cached is changed, or to a checkpoint operation when certain conditions are satisfied.

If a checkpoint operation occurs when a cache block is at a frozen up-to-date dirty state, the content of the cache block is transmitted to and finally stored in the storage 20. Since the content of the cache block does not need to be write-protected any longer and a history of past changes is meaningless now, the cache block is released from being frozen and enters a normal up-to-date clean cache state.

If a write operation is performed on a frozen up-to-date dirty cache block, writing cannot be performed on this cache block because it is in a frozen state. This cache block now has the out-of-date content of a corresponding data block, and thus it is referred to as a frozen out-of-date dirty cache block. Meanwhile, the changed content of the data block that attempted to be written on the frozen cache block is written on a free cache block that is found through a search.

When a subsequent in-place commit operation is triggered and thus the cache block having up-to-date data is in-place committed, a frozen out-of-date dirty cache block may be removed from checkpoint transactions by being inserted in an obsolete block list and, or may be subjected to cache recycling processing by setting an obsoleteness flag in a data block header.

Meanwhile, read operations can be freely performed on cache blocks having up-to-date content, that is, normal up-to-date clean, normal up-to-date dirty, and frozen up-to-date dirty cache blocks.

In contrast, since a cache block in a frozen and out-of-date dirty state is an obsolete cache block having an out-of-date content that is not called for by an OS to perform a read operation, and further, the reflection of up-to-date data to the storage 20 is guaranteed at the present time the cache block in these states is not necessary in fact any more. Accordingly, as described above, in some embodiments, immediately at entering to a frozen out-of-date dirty state or later when a checkpoint operation occurs, a frozen cache block may be treated with cache recycling processing, in which the cache block may be released from being frozen, then the content thereof may be deleted, and then the cache block may be returned as a free cache block.

Figure 4:
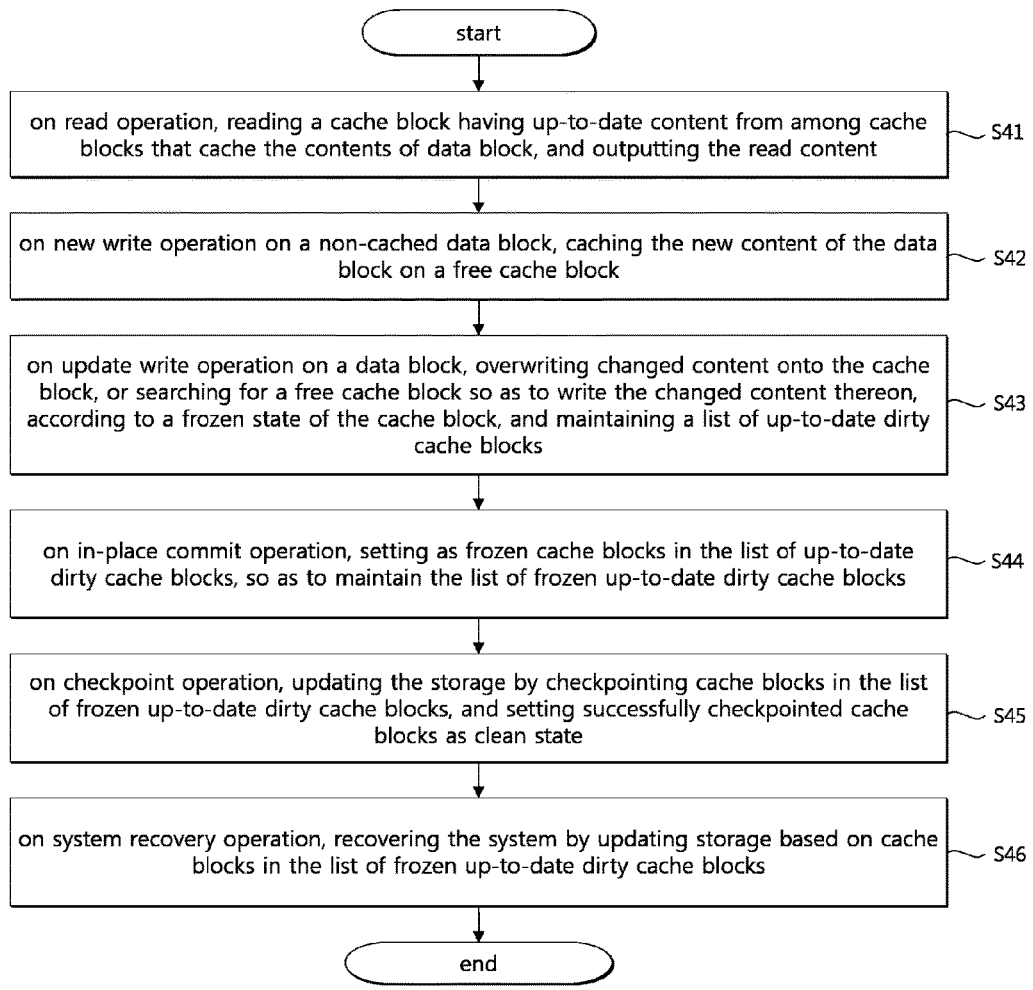
FIG. 4 is a flowchart illustrating a journaling method using buffer caches with journaling features based on nonvolatile memory according to an embodiment of the present invention.

FIG. 4 is a flowchart illustrating a journaling method using buffer caches with journaling features based on nonvolatile memory according to an embodiment of the present invention.

Referring to FIG. 4, in the journaling method using buffer caches with journaling features, at first step S41, upon a read operation, the buffer cache apparatus 10 reads a cache block having the most up-to-date content from among cache blocks that cache the time-varying contents of data block, to which the read operation is requested, and then outputs the read content.

At step S42, upon a new write operation on a data block that has not been cached previously, the buffer cache apparatus 10 caches the new content of the data block, to which the write operation is requested, on a free cache block.

At step S43, upon an update write operation on a data block to which the write operation with a changed content has been requested, the buffer cache apparatus 10 overwrites the changed content onto the corresponding cache block, or searches for a free cache block so as to write the changed content thereon, according to a frozen, or write-protected, state of the cache block that is caching the corresponding data block, and maintains a list of up-to-date dirty cache blocks respectively having changed contents.

More specifically, the list of up-to-date dirty cache blocks respectively having changed contents may be maintained as a list of running transactions, that is, transactions related to cache blocks that, having been free or clean state, are requested to cache the changed contents of the corresponding data blocks and then become up-to-date dirty state. The list of running transactions that exists upon any update write operation is identical to a list of cache blocks in a normal up-to-date dirty state.

At step S44, when an in-place commit operation is triggered, the buffer cache apparatus 10 sets as frozen cache blocks referenced by the list of up-to-date dirty cache blocks, and maintains the list of frozen up-to-date dirty cache blocks.

More specifically, the list of frozen up-to-date dirty cache blocks may be maintained as a list of checkpoint transactions, related to up-to-date dirty cache blocks set as frozen during in-place commit operations, among a list of running transactions being created and managed for cache blocks that are updated upon update write operations.

At step S45, when a checkpoint operation is triggered, the buffer cache apparatus 10 updates the storage 20 by checkpointing cache blocks referenced by the list of frozen up-to-date dirty cache blocks, and sets successfully checkpointed cache blocks as clean state.

More specifically, the list of frozen up-to-date dirty cache blocks may be maintained as a list of checkpoint transactions, related to up-to-date dirty cache blocks set as frozen during in-place commit operations, among a list of running transactions being created and managed for cache blocks that are updated upon update write operations.

At step S46, when a system recovery operation is triggered by the control unit 30, the buffer cache apparatus 10 recovers the system by updating the storage 20 based on cache blocks referenced by the list of frozen up-to-date dirty cache blocks.

Steps S41 to S46 may occur non-sequentially in response to operations triggered by the control unit 30.

Figure 5:
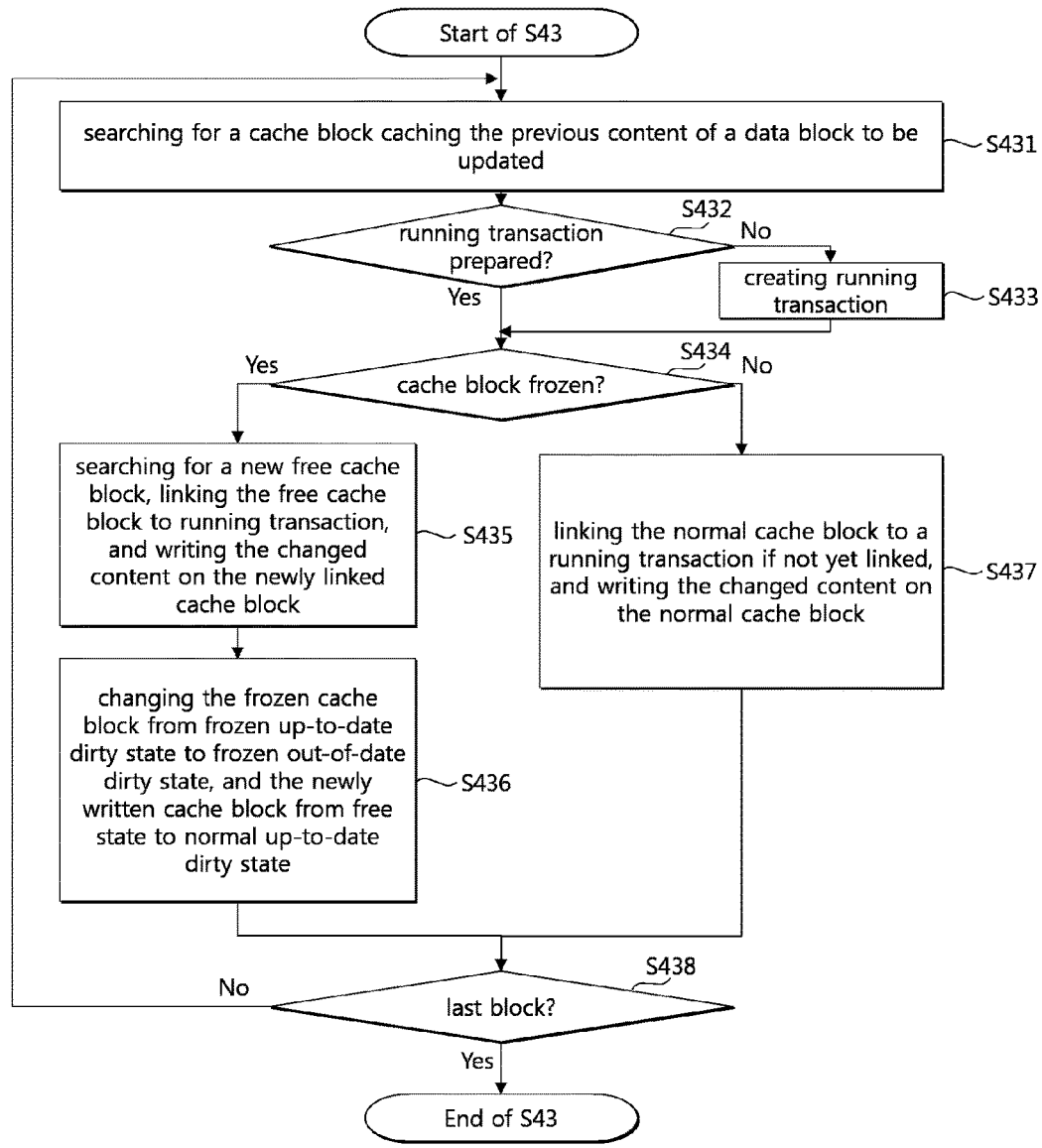
FIG. 5 is a flowchart more specifically illustrating the update write operation of the journal incorporated buffer caches in the journaling method using buffer caches with journaling features based on nonvolatile memory according to an embodiment of the present invention.

Meanwhile, referring to FIG. 5 in order to describe step S43 in greater detail, FIG. 5 is a flowchart more specifically illustrating the update write operation of the journaling incorporation buffer caches in the journaling method using buffer caches into which journaling features have been incorporated based on nonvolatile memory according to an embodiment of the present invention.

In FIG. 5, step S43 related to an update write operation for the changed content of at least one data block starts with step S431. In step S431, the buffer cache apparatus 10 searches for a cache block that is caching the previous content of a data block to which the write operation of the changed content has been requested.

At step S432, it is determined whether a running transaction relates to a data block to be changed exist or not. If no running transaction, the running transaction for the present data block is created at step S433.

At step S434, it is determined whether the found cache block has been frozen. If the found cache block has been frozen, the process proceeds to step S435. Otherwise the process proceeds to step 438.

If it is determined at step S434 that the found cache block has been frozen, the buffer cache apparatus 10 searches for a new free cache block other than the frozen cache block, links the found free cache block to the running transaction, and writes the changed content on the newly linked cache block at step S435.

At step S436, the buffer cache apparatus 10 changes the frozen cache block that is caching previous content from frozen up-to-date dirty state to frozen out-of-date dirty state, and changes the cache block on which the changed content has been written from free state to normal up-to-date dirty state. Metadata about the changes of cache state may be recorded in the journal management unit 11.

If it is determined at step S434 that the found cache block has not been frozen, the buffer cache apparatus 10 links a normal cache block to a running transaction if the normal cache block is not yet linked to any running transaction, and writes the changed content on the normal cache block at step S437. Accordingly, the cache block enters an up-to-date dirty state.

The list of running transactions may be recorded in the journal management unit 11 in the form of metadata, and blocks included in the list correspond to up-to-date dirty cache blocks.

At step S438, it is determined whether the cache block on which the changed content has been written is the last block of the update write operation. If the cache block is not the last block, the process returns to step S431. In contrast, if the cache block is not the last block, the write operation of step S43 terminates.

Figure 6:
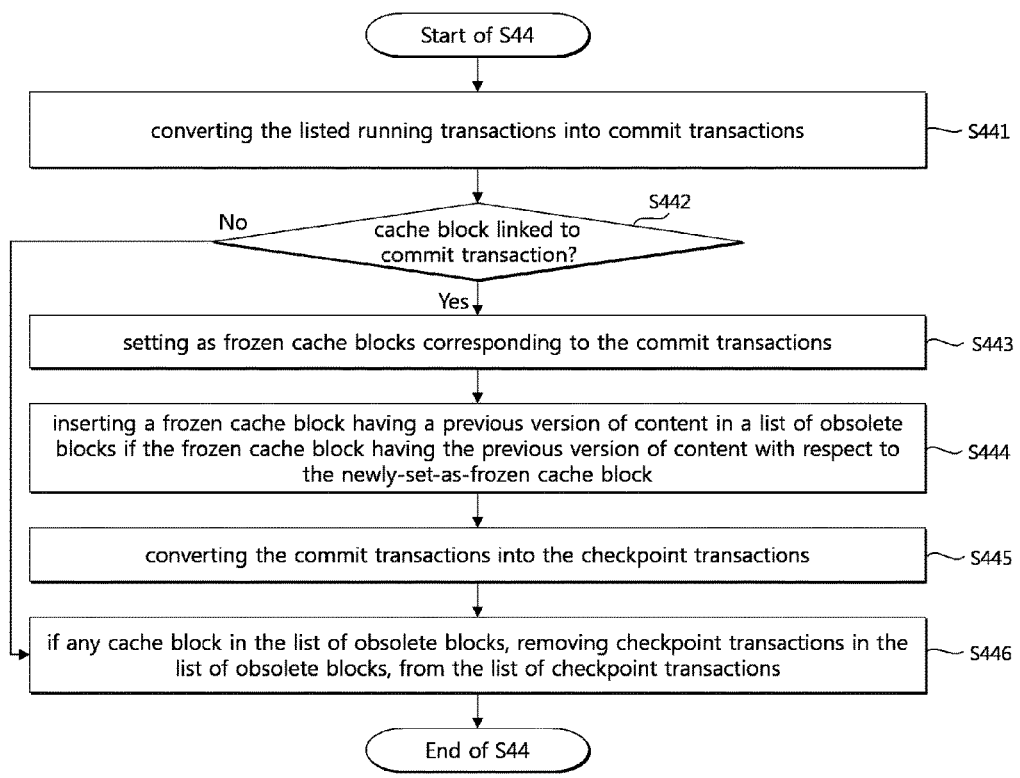
FIG. 6 is a flowchart more specifically illustrating the in-place commit operation of the journal incorporated buffer caches in the journaling method using buffer caches with journaling features based on nonvolatile memory according to an embodiment of the present invention.

Furthermore, referring to FIG. 6 in order to describe the in-place commit operation of step S44 in greater detail, FIG. 6 is a flowchart more specifically illustrating the in-place commit operation of the journaling buffer caches in the journaling method using buffer caches with journaling features based on nonvolatile memory according to an embodiment of the present invention.

In FIG. 6, step S44 for the in-place commit operation triggered by the control unit 30 starts with step S441 at which the buffer cache apparatus 10 converts the listed running transactions into commit transactions.

The list of running transactions is initialized as soon as the listed running transactions are converted into commit transactions. New running transactions that are newly created by update write operations will be newly listed.

Next, at step S442, the buffer cache apparatus 10 determines whether a cache block linked to the list of the converted commit transactions exists or not, and, if not, the in-place commit operation of step S44 proceeds to step S446.

If there exists any cache block linked to the list of commit transactions at step S442, the buffer cache apparatus 10 set as frozen cache blocks corresponding to the commit transactions at step S443.

At step S444, the buffer cache apparatus 10 inserts a frozen cache block having a previous version of content in a list of obsolete blocks if the frozen cache block having the previous version of content with respect to the cache block set as frozen at step S443.

At step S445, the buffer cache apparatus 10 converts the commit transactions into the checkpoint transactions.

At step S446, if any cache block exists in the list of obsolete blocks, the buffer cache apparatus 10 removes checkpoint transactions, to which the cache blocks included in the list of obsolete blocks are linked, from the list of checkpoint transactions, thereby terminating step S44 for the in-place commit operation.

Since a plurality of in-place commit operations may occur between two checkpoint operations, commit transactions are converted into checkpoint transactions for every in-place commit operation, and the converted checkpoint transactions are added into the list of checkpoint transactions, or the cache blocks inserted in the list of obsolete blocks are removed from the list of checkpoint transactions. Accordingly, the list of checkpoint transactions may vary upon each in-place commit operation being performed.

Figure 7:
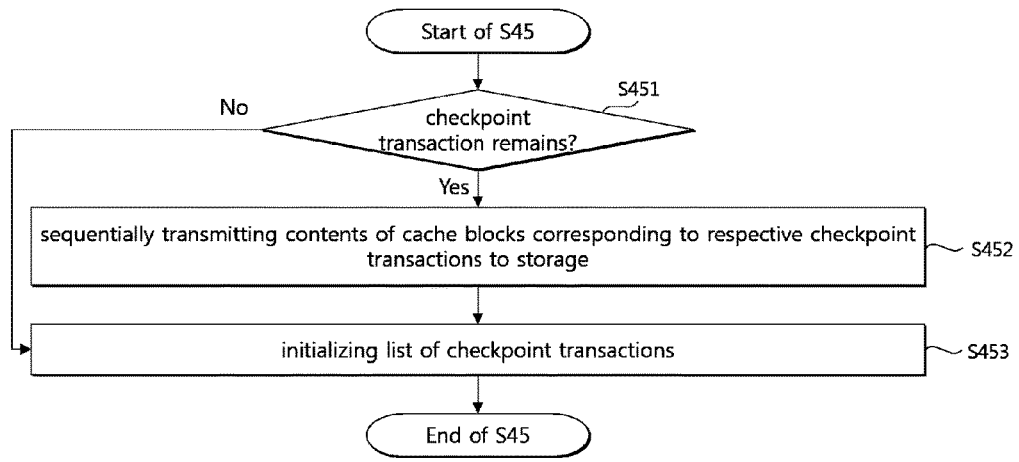
FIG. 7 is a flowchart more specifically illustrating the checkpoint operation of the journal incorporated buffer caches in the journaling method using buffer caches with journaling features based on nonvolatile memory according to an embodiment of the present invention.

Furthermore, referring to FIG. 7 in order to illustrate the checkpoint operation of step S45 in greater detail, FIG. 7 is a flowchart more specifically illustrating the checkpoint operation of the journaling buffer caches in the journaling method using buffer caches with journaling features based on nonvolatile memory according to an embodiment of the present invention.

In FIG. 7, in the checkpoint operation of step S45, the buffer cache apparatus 10 determines whether at least one checkpoint transaction remains in the list of checkpoint transactions at step S451, and, if not, the checkpoint operation step S45 proceeds to step S453.

If at least one checkpoint transaction remains at step S451, the buffer cache apparatus 10 sequentially transmits contents of the cache blocks corresponding to the respective checkpoint transactions to the storage 20 at step S452.

At step S453, the buffer cache apparatus 10 initializes the list of checkpoint transactions.

Figure 8:
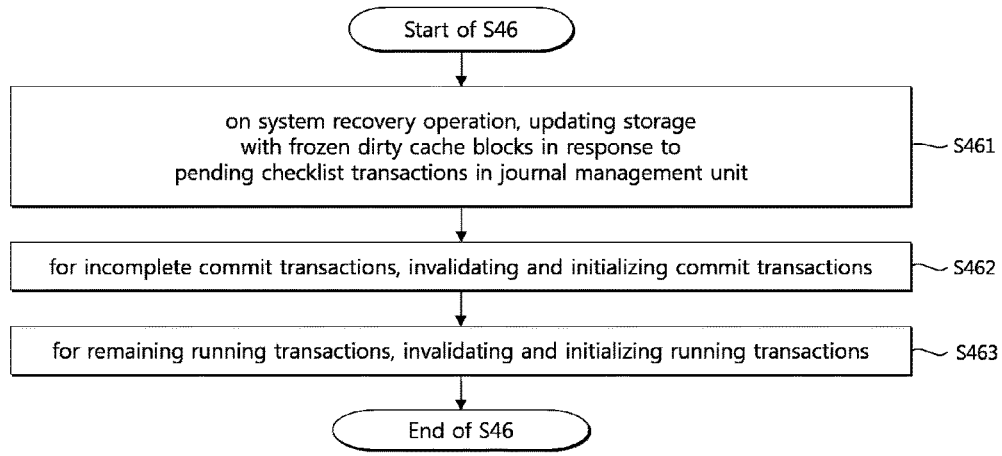
FIG. 8 is a flowchart illustrating the system recovery operation of the journal incorporated buffer caches in the journaling method using buffer caches with journaling features based on nonvolatile memory according to an embodiment of the present invention.

Furthermore, referring to FIG. 8 in order to illustrate the system recovery operation of step S46 in greater detail, FIG. 8 is a flowchart more specifically illustrating the system recovery operation of the journaling buffer caches in the journaling method using buffer caches with journaling features based on nonvolatile memory according to an embodiment of the present invention.

In the system recovery operation of step S46, when the system recovery operation is triggered by the control unit 30, the buffer cache apparatus 10 updates the storage 20 with frozen dirty cache blocks based on pending checklist transactions, which means not-yet-completed checkpoint transactions, in the journal management unit 11 at step S461.

At step S462, if the incomplete commit transactions exist, the incomplete commit transactions are invalidated and initialized.

At step S463, if the running transactions remain, the remaining running transactions are invalidated and initialized.

As a result, existence of the frozen up-to-date dirty cache blocks can be determined by just referring to checklist transactions maintained in the journal management unit 11 of the buffer cache apparatus 10 up to a system failure, and furthermore a system failure can be handled by just updating data blocks in the storage 20 with content stored in the frozen up-to-date dirty cache blocks.

Accordingly, the journaling method according to the present invention has excellent advantages in terms of speed and cost because it is not necessary to prepare a separate storage space for a journaling function, other than the buffer caches, and to create and manage copies.

Furthermore, the journaling method according to the present invention does not incur excessive traffic for journaling in a cloud network, and thus it can be easily applied even to a cloud-based storage system.

Furthermore, the apparatus according to the present invention may be implemented as computer-readable code stored in a computer-readable storage medium. The computer-readable storage medium includes all types of storage devices in which computer system-readable data is stored. Examples of the computer-readable storage medium are Read Only Memory (ROM), Random Access Memory (RAM), an optical disk, magnetic tape, a floppy disk, a hard disk, and nonvolatile memory. Furthermore, the computer-readable storage medium may be implemented as carrier waves (for example, in the case of transmission over the Internet). Moreover, the computer-readable medium may be distributed across computer systems connected via a network, so that computer-readable code can be stored and executed in a distributed manner.

The buffer cache apparatus, the journaling file system, and the journaling method capable of incorporating journaling features based on nonvolatile memory according to the present invention utilize nonvolatile buffer caches themselves as a space for maintaining journal data, and thus it is not necessary to ensure and manage an independent memory space so as to journal data about changes.

The buffer cache apparatus, the journaling file system, and the journaling method capable of incorporating journaling features based on nonvolatile memory according to the present invention can suppress the occurrence of storage write traffic in applications in which changes frequently occur to a level almost identical to the level of a system without a journaling function.

The buffer cache apparatus, the journaling file system, and the journaling method capable of incorporating journaling features based on nonvolatile memory according to the present invention are configured such that journaled data provides a caching function at a corresponding location, and thus highly reliable data can be provided without degrading the performance of the buffer caches.

The buffer cache apparatus, the journaling file system, and the journaling method capable of incorporating journaling features based on nonvolatile memory according to the present invention perform journaling in the buffer caches, and thus additional network traffic attributable to the journaling of data about changes in a cloud is not incurred even in a cloud-based storage system, thereby being able to be also applied to a cloud-based storage system.

The buffer cache apparatus, the journaling file system, and the journaling method capable of incorporating journaling features based on nonvolatile memory according to the present invention can be applied to a conventional hard disk system, an up-to-date solid disk system, and any other types of mass storage systems.

The buffer cache apparatus, the journaling file system, and the journaling method capable of incorporating journaling features based on nonvolatile memory according to the present invention can be applied to the case in a volatile memory device is used as main memory as long as power is normally supplied, as well as to the case in which a nonvolatile memory device is used.

Although the present invention has been described in conjunction with limited embodiments and drawings, the present invention is not limited to the embodiments, but, from the above description, various modifications and variations will be apparent to those having ordinary knowledge in the technical field to which the present invention pertains. Accordingly, the spirit of the present invention should be interpreted based only on the following claims, and all equivalents or equivalent variations pertain to the scope of the spirit of the present invention.

What is claimed is:

1. A journaling method performed for a non-volatile buffer cache in a file system, the journaling method comprising:
   identifying a plurality of cache blocks in the non-volatile buffer cache; and
   performing in-place commit operation for the a first cache block with normal dirty state among the plurality of cache blocks in the non-volatile buffer cache, and changing a state of the first cache block from the normal dirty state to the frozen dirty state;
   performing write operation by updating a content of a data block into a second cache block with clean state, instead of the first cache block with the frozen dirty state which is performed in-place commit operation, so that the first cache block being performed in-place commit operation is not overwritten with the content, and changing a state of the second cache block from the clean state to the normal dirty state;
   performing in-place commit operation for the second cache block with normal dirty state, and changing the state of the first cache block from frozen dirty state to frozen dirty out-of-date state, and changing the state of the second cache block from normal dirty state to frozen dirty up-to-date state; and
   performing checkpoint operation periodically,
   wherein when the checkpoint operation occurs, the frozen dirty out-of-date state of the first cache block is converted into a free state, and the content cached by the first cache block is deleted,
   wherein when the checkpoint operation occurs, the frozen dirty up-to-date state of the second cache block is converted into the clean state, and the content cached by the second cache block is transmitted into a storage,
   when a problem occurs in the file system after in-place commit operation has been completed, the file system is recovered with a content which is stored in the in-place committed cache block in the non-volatile buffer cache,
   when the problem occurs in the file system before in-place commit operation has been completed, the file system is recovered with a content which is stored in the data block of the storage, and the content in the cache block is discarded.

2. The journaling method of claim 1, wherein the in-place commit operation is performed for the cache block with normal dirty state among the plurality of cache blocks, not the cache block with free state or the cache block with clean state.

3. The journaling method of claim 2, wherein the free state for the cache block is state that the cache block has not been stored,
   wherein the clean state for the cache block is state that the cache block has not been changed after being stored.

4. The journaling method of claim 2, wherein the normal dirty state for the cache block is state that the cache block is overwritten with a changed content of the data block, when the content has been changed in the data block buffered by the cache block with clean state.

5. The journaling method of claim 2, wherein the clean state is converted into the normal dirty state based on a write operation,
   wherein the normal dirty state is converted into the frozen dirty state based the in-place commit operation.

6. A non-volatile buffer cache in a file system, the non-volatile buffer cache comprising:
   processor for managing journaling configured to identify a plurality of cache blocks in the non-volatile buffer cache; and
   perform in-place commit operation for the a first cache block with normal dirty state among the plurality of cache blocks in the non-volatile buffer cache and change a state of the first cache block from the normal dirty state to the frozen dirty state;
   perform write operation by updating a content of a data block into a second cache block with clean state, instead of the first cache block with the frozen dirty state which is performed in-place commit operation, so that the first cache block being performed in-place commit operation is not overwritten with the content, and change a state of the second cache block from the clean state to the normal dirty state;
   performing in-place commit operation for the second cache block with normal dirty state, and changing the state of the first cache block from frozen dirty state to frozen dirty out-of-date state, and change the state of the second cache block from normal dirty state to frozen dirty up-to-date state; and perform checkpoint operation periodically, wherein when the checkpoint operation occurs, the frozen dirty out-of-date state of the first cache block is converted into a free state, and the content cached by the first cache block is deleted, wherein when the checkpoint operation occurs, the frozen dirty up-to-date state of the second cache block is converted into the clean state, and the content cached by the second cache block is stored into a storage and not deleted, when a problem occurs in the file system after in-place commit operation has been completed, the file system is recovered with a content which is stored in the in-place committed cache block in the non-volatile buffer cache, when the problem occurs in the file system before in-place, commit operation has been completed, the file system is recovered with a content which is stored in the data block of the storage, and the content in the cache block is discarded.

7. The non-volatile buffer cache of claim 6, wherein the in-place commit operation is performed for the cache block with normal dirty state among the plurality of cache blocks, not the cache block with free state or the cache block with clean state.

8. The non-volatile buffer cache of claim 7, wherein the free state for the cache block is state that the cache block has not been stored, wherein the clean state for the cache block is state that the cache block has not been changed after being stored.

9. The non-volatile buffer cache of claim 7, wherein the normal dirty state for the cache block is state that the cache block is overwritten with a changed content of the data block, when the content has been changed in the data block buffered by the cache block with clean state.

10. The non-volatile buffer cache of claim 7, wherein the clean state is converted into the normal dirty state based on a write operation, wherein the normal dirty state is converted into the frozen dirty state based the in-place commit operation.

* * * * *